United States Patent [19]

Nagayoshi et al.

[11] Patent Number: 5,481,906
[45] Date of Patent: Jan. 9, 1996

[54] FAULT DIAGNOSIS APPARATUS AND METHOD FOR VEHICLE CONTROL SYSTEM

[75] Inventors: Yoshimasa Nagayoshi, Kyoto; Takeshi Asano, Kusatsu; Ikuo Maruyama, Kameoka; Masakazu Kinoshita, Kyoto, all of Japan

[73] Assignee: Mitsubishi Jidosha Kogyo Kabushiki Kaisha, Tokyo, Japan

[21] Appl. No.: 265,850

[22] Filed: Jun. 27, 1994

[30] Foreign Application Priority Data

Jun. 30, 1993 [JP] Japan ..................... 5-161887

[51] Int. Cl.$^6$ ......................................... G06F 17/00
[52] U.S. Cl. .................. 73/116; 364/424.03; 364/424.05
[58] Field of Search .................. 73/116; 364/424.01, 364/424.02, 424.03, 424.04, 424.05, 431.04, 431.12

[56] References Cited

U.S. PATENT DOCUMENTS

| | | | |
|---|---|---|---|
| 4,328,546 | 5/1982 | Kreft et al. | 73/116 |
| 4,975,846 | 12/1990 | Abe et al. | 73/116 |
| 4,975,848 | 12/1990 | Abe et al. | 73/116 |
| 5,111,686 | 5/1992 | Kamiya et al. | 73/117.3 |
| 5,157,613 | 10/1992 | Williams et al. | 364/431.08 |
| 5,365,436 | 11/1994 | Schaller et al. | 364/424.03 |
| 5,369,584 | 11/1994 | Kajiwara | 364/424.05 |

FOREIGN PATENT DOCUMENTS 2656439 6/1991 France .
2125577 3/1984 United Kingdom .

OTHER PUBLICATIONS

Patent Abstracts of Japan, vol. 15, No. 312 (P-1236), Aug. 9, 1991, & JP-A-03 111 733 (Kowa Seiki KK), May 13, 1991.
Patent Abstracts of Japan, vol. 9, No. 313 (M-437) (2036), Dec. 10, 1985, & JP-A-60 147 553 (Nippon Denso K.K.), Aug. 3, 1985.
Patent Abstracts of Japan, vol. 11, No. 399 (P-651), Dec. 26, 1987 & JP-A-62 161 037 (Nippon Denso Co Ltd), Jul. 17, 1987.
Patent Abstracts of Japan, vol. 13, No. 50 (P-823), Feb. 6, 1989 & JP-A-63 243 832 (Mitsubishi Motors Corp.), Oct. 11, 1988.

Primary Examiner—Richard Chilcot
Assistant Examiner—Eric S. McCall
Attorney, Agent, or Firm—Evenson, McKeown, Edwards & Lenahan

[57] ABSTRACT

This invention relates to a fault diagnosis apparatus for a vehicle control system. The fault diagnosis apparatus is useful in diagnosing a fault of an electronic component mounted on a vehicle, especially when the fault has led to such a control as deteriorating exhaust gas. It is an object of this invention to minimize an increase in the manufacturing cost upon incorporation of such a fault diagnosis apparatus. According to this invention, the vehicle control system has an automatic transmission operation state detection sensor, an engine operation state detection sensor, an automatic transmission control unit and an engine control unit. For the diagnosis of a fault of at least one of the sensors and control units, the fault diagnosis apparatus comprises a fault determining unit, a code converter, a fault determining unit, a code converter, an ISO converter and a determining and diagnosing tester.

16 Claims, 7 Drawing Sheets

THROTTLE POSITION SENSOR TROUBLE

AIR FLOW SENSOR TROUBLE

O₂ SENSOR TROUBLE

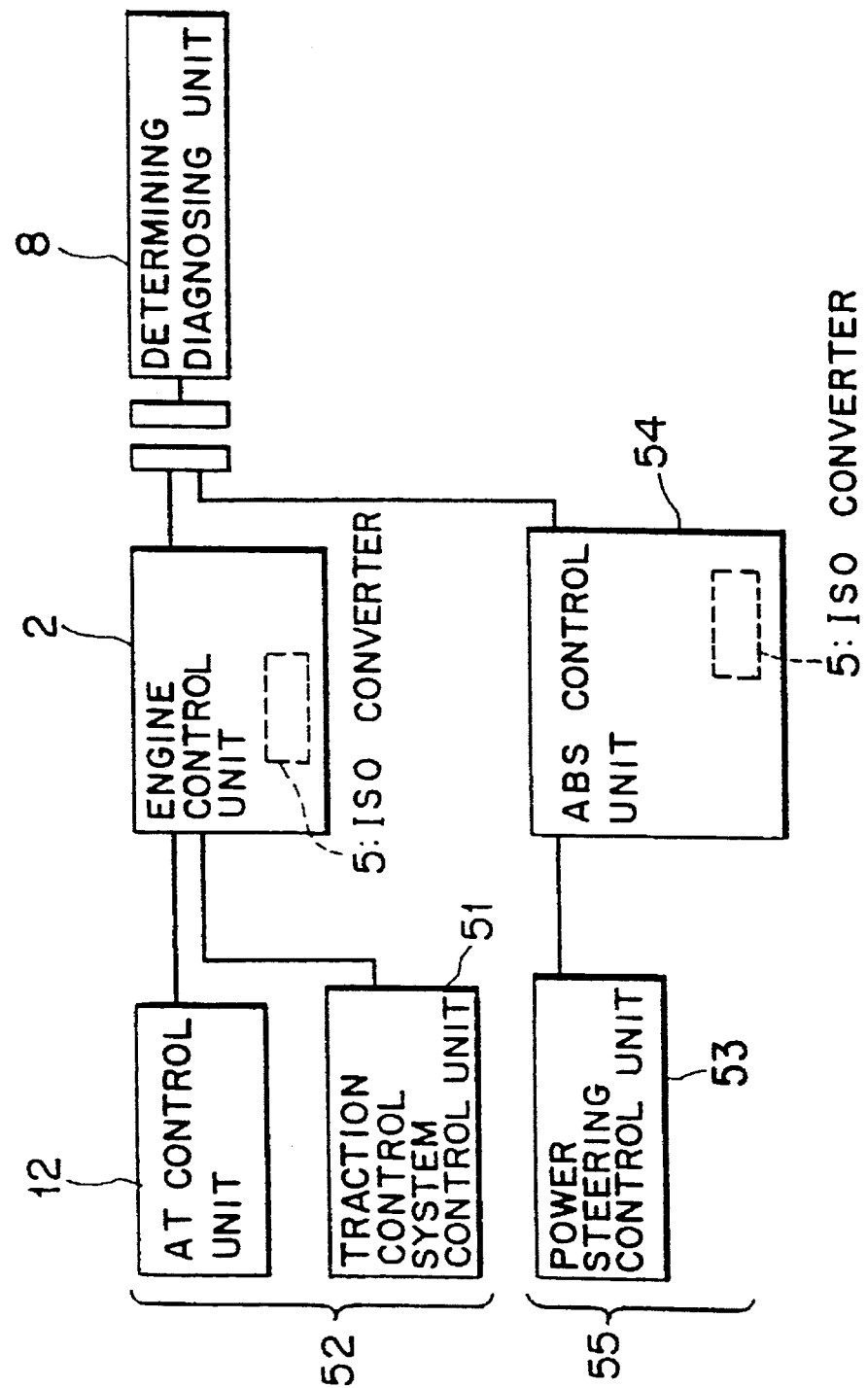

FAULT DIAGNOSIS APPARATUS AND METHOD FOR VEHICLE CONTROL SYSTEM

BACKGROUND OF THE INVENTION

1) Field of the Invention

This invention relates to a fault diagnosis apparatus and method for a vehicle control system. The fault diagnosis apparatus and method are useful in diagnosing a fault of an electronic component mounted on a vehicle, especially when the fault has led to such a control as deteriorating exhaust gas.

2) Description of the Related Art

It has been the common practice to electronically control the operations of an engine, an automatic transmission (which may hereinafter be abbreviated as "AT") and the like, which are mounted on a vehicle. Their control is however performed based on outputs from plural sensors, resulting in the inconvenience that appropriate control would no longer be feasible if one or more of the sensors fail. To cope with this inconvenience, each automobile maker has adopted its own fault diagnosis method, thereby detecting a fault of a sensor and outputting its own sensor fault signal to its own diagnosis system.

In the meantime, regulations on the emission control (the so-called "OBD-II") have been introduced recently in the United States. Under the regulations, it is required that if control of an automatic transmission mounted on a vehicle is performed in such a way as deteriorating the exhaust gas emitted from the vehicle, a failed electronic component for the AT control, said failed electronic component being responsible for the deteriorated exhaust gas, should be detected and also informed to the driver by turning on an indicator lamp or the like. This applies equally to electronic components for the control of an engine.

According to the above regulations, fault signals independently detected by individual automotive makers are coded in accordance with the communication rules (ISO 9141) specified by the regulations so that when a prescribed diagnosis system is employed, each failed electronic component can be detected as a common signal irrespective of the maker.

Now assume, for example, that a vehicle is equipped with an engine control unit (ECU), an AT control unit and a further control unit for other devices. Where a fault responsible for a deterioration in exhaust gas is detected in one of electronic components of each control unit, it may then be thought of informing the fault by turning on an indicator lamp as described above and further of coding a fault signal in each control unit in accordance with the communication rules prescribed above and then outputting the thus-coded fault signal to a diagnosis system.

This however requires to provide each of the control unit with a conversion unit which can output a coded signal conforming with the prescribed communication system described above, resulting in the problem that the construction becomes complex and a significant increase is unavoidable in the manufacturing cost.

SUMMARY OF THE INVENTION

With the foregoing problem in view, the present invention has as a primary object thereof the provision of a fault diagnosis apparatus and method for a vehicle control system, which can simplify the construction and minimize an increase in the manufacturing cost by making it possible to efficiently output coded signals conforming with the prescribed communication system.

To achieve the above object, the present invention provides the following fault diagnosis apparatus and methods for a vehicle control system:

(A)

A fault diagnosis apparatus for a vehicle control system having:

first operation state detection means for detecting the state of operation of a desired first element out of vehicle-constructing elements mounted on a vehicle, second operation state detection means for detecting the state of operation of a desired second element out of said vehicle-constructing elements, said desired second element being different from said desired first element, a first control unit for controlling said desired first element on the basis of an output from said first operation state detection means, and a second control unit for controlling said desired second element on the basis of an output from said second operation state detection means, whereby a fault of at least one of said first operation state detection means, said second operation state detection means, said first control unit and said second control unit is diagnosed, characterized in that said apparatus comprises:

first fault detection means arranged in association with said first control unit to detect a fault of at least one of said first control unit and said first operation state detection means;

first fault signal output means arranged in association with said first control unit to output to said second control unit a fault detection signal, which has been received from said first fault detection means, as a fault signal specific to said first control unit.

second fault detection means arranged in association with said second control unit to detect a fault of at least one of said second control unit and said second operation state detection means;

second fault signal output means arranged in association with said second control unit to output a fault detection signal, which has been received from said second fault detection means, as a fault signal specific to said second control unit;

converter means arranged in association with said second control unit to receive the fault signal from at least one of said first fault signal output means and said second fault signal output means and then to convert said fault signal into a signal which conforms with a predetermined communication system; and determining and diagnosing means for reading the fault signal so converted, thereby determining and diagnosing the fault of at least one of said first control unit, said first operation state detection means, the fault of said second control unit and said second operation state detection means.

The apparatus (A) may include the following optional features: (A-1)

The fault diagnosis apparatus (A) may further comprise means for informing a fault, if any, of said first control unit or said first operation state detection means.

(A-2)

The fault diagnosis apparatus (A) may further comprise means for informing a fault, if any, of said second control unit or said second operation state detection means.

(A-3)

The fault diagnosis apparatus (A) may further comprise second determining and diagnosing means for reading a fault signal from said first fault signal output means to determine and diagnose a fault of said first control unit or said first operation state detection means.

(A-4)

The fault diagnosis apparatus (A), may further comprise second determining and diagnosing means for reading a fault signal from said second fault signal output means to determine and diagnose a fault of said second control unit or said second operation state detection means.

(A-5)

In the fault diagnosis apparatus (A), one of an engine control unit for controlling an engine mounted on said vehicle and an automatic transmission control unit for controlling an automatic transmission connected to said engine is said first control unit and the other is said second control unit.

(A-6)

In the fault diagnosis apparatus (A), at least one third control unit selected from a TRC (traction control system) control unit, an ABS control unit and a power steering control unit, to which third control unit third operation state detection means is connected to detect the state of operation of said third control unit, is connected to said second control unit, whereby information on the detection of a fault in said third control unit or said third operation state detection means is outputted to said second control unit.

(B)

A fault diagnosis method for a vehicle control system having:

first operation state detection means for detecting the state of operation of a desired first element out of vehicle-constructing elements mounted on a vehicle, second operation state detection means for detecting the state of operation of a desired second element out of said vehicle-constructing elements, said desired second element being different from said desired first element, a first control unit for controlling said desired first element on the basis of an output from said first operation state detection means, and a second control unit for controlling said desired second element on the basis of an output from said second operation state detection means, whereby a fault of at least one of said first operation state detection means, said second operation state detection means, said first control unit and said second control unit is diagnosed, characterized in that said method comprises:

a first fault detection step for detecting a fault of at least one of said first control unit and said first operation state detection means to output a fault detection signal;

a first fault signal output step for outputting, upon receipt of the fault detection signal from said first fault detection step, the fault detection signal to said second control unit as a fault signal specific to said first control unit;

a second fault detection step for detecting a fault of at least one of said second control unit and said second operation state detection means to output a fault detection signal;

a second fault signal output step for outputting, upon receipt of the fault detection signal from said second fault detection step, the fault detection signal to said first control unit as a fault signal specific to said second control unit;

a signal conversion step for receiving at least one of the fault signal specific to said first control unit and the fault signal specific to said second control unit and converting the fault signal into a signal which conforms with a predetermined communication system; and a determination and diagnosis step for reading the fault signal so converted and determining and diagnosing the fault of at least one of said first control unit, said first operation state detection means, the fault of said second control unit and said second operation state detection means.

The above method (B) may include the following optional features:

(B-1)

The fault diagnosis method (B) may further comprise a step for informing the fault of said first control unit or said first operation state detection means on the basis of the converted fault signal.

(B-2)

The fault diagnosis method (B) may further comprise a step for informing the fault of said second control unit or said second operation state detection means on the basis of the converted fault signal.

(B-3)

The fault diagnosis method may further comprise a second determination and diagnosis step for reading the fault signal, which is specific to said first control unit and has been outputted in said first fault signal output step, and determining and diagnosing the fault of said first control unit or said first operation state detection means.

(B-4)

The fault diagnosis method may further comprise a second determination and diagnosis step for reading the fault signal, which is specific to said second control unit and has been outputted in said second fault signal output step, and determining and diagnosing the fault of said second control unit or said second operation state detection means.

(C)

A fault diagnosis method for a vehicle control system having:

means for detecting the state of operation of an automatic transmission connected to an engine mounted on a vehicle;

means for detecting the state of operation of said engine, a transmission control unit for controlling said automatic transmission, and an engine control unit for controlling said engine, whereby a fault of at least one of said transmission operation state detection means, said engine operation state detection means, said transmission control unit and said engine control unit is diagnosed, characterized in that said method comprises:

a first fault detection step for detecting a fault of at least one of said transmission control unit and said transmission operation state detection means to output a fault detection signal;

a first fault signal output step for outputting, upon receipt of the fault detection signal from said first fault detection step, the fault detection signal to said engine control unit as a fault signal specific to said transmission control unit;

a second fault detection step for detecting a fault of at least one of said engine control unit and said engine operate state detection means to output a fault detection signal;

a second fault signal output step for outputting, upon receipt of the fault detection signal from said second fault detection step, the fault detection signal to said transmission control unit as a fault signal specific to said engine control unit;

a signal conversion step for receiving at least one of the fault signal specific to said transmission control unit and the fault signal specific to said engine control unit and converting the fault signal into a signal which conforms with a predetermined communication system; and a determination and diagnosis step for reading the fault signals so converted and determining and diagnosing the fault of at least one of said transmission control unit, said transmission operation state detection means, the fault of said engine control unit and said engine operation state detection means.

Operations and advantages of the apparatus (A) and the method (B,C) and their optional features (A-6, B-4) will hereinafter be described.

Apparatus (A)

According to the fault diagnosis apparatus (A) for the vehicle control system, the state of operation of the desired first element out of vehicle-constructing elements mounted on the vehicle is detected by the first operation state detection means, and the state of operation of the desired second element out of the vehicle-constructing elements, said desired second element being different from the desired first element, is detected by the second operation state detection means.

The first control unit controls the desired first element on the basis of an output from the first operation state detection means, and the second control unit controls the desired second element on the basis of an output from the second operation state detection means.

A fault of at least one of the first operation state detection means, the second operation state detection means, the first control unit and the second control unit is then diagnosed.

Namely, when the first fault detection means detects a fault of at least one of the first control unit and the first operation state detection means, the first fault signal output means receives a fault detection signal and outputs it as a fault signal specific to the first control unit.

When the second fault detection means detects a fault of at least one of the second control unit and the second operation state detection means, the second fault signal output means receives a fault detection signal and outputs it as a fault signal specific to the second control unit.

The converter means receives the fault signal from at least one of the first fault signal output means and the second fault signal output means and then converts the fault signal into a signal which conforms with a predetermined communication system. The determining and diagnosing means reads the fault signal so converted, thereby determining and diagnosing the fault of at least one of the first control unit, the first operation state detection means, the fault of the second control unit and the second operation state detection means.

Optional feature (A-1)

If the first control unit or the first operation state detection means has a fault, the informing means informs the fault.

Optional Feature (A-2)

If the second control unit or the second operation state detection means has a fault, the informing means informs the fault.

Optional Feature (A-3)

The second determining and diagnosing means reads a fault signal from the first fault signal output means to determine and diagnose a fault of the first control unit or the first operation state detection means.

Optional Feature (A-4)

The second determining and diagnosing means reads a fault signal from the second fault signal output means to determine and diagnose a fault of the second control unit or the second operation state detection means.

Optional Feature (A-5)

One of the engine control unit for controlling the engine mounted on the vehicle and the automatic transmission control unit for controlling the automatic transmission connected to the engine is the first control unit and the other is the second control unit, Optional Feature (A-6)

At least one third control unit selected from the TRC (traction control system) control unit, the ABS control unit and the power steering control unit, to which third control unit third operation state detection means is connected to detect the state of operation of the third control unit, is connected to the second control unit, whereby information on the detection of a fault in the third control unit or the third operation state detection means is outputted to the second control unit so that the fault of the third control unit or of the third operation state detection means connected to the third control unit is detected.

Method (B)

The first operation state detection means detects the state of operation of the desired first element out of the vehicle-constructing elements mounted on the vehicle, while the second operation state detection means detects the state of operation of the desired second element out of the vehicle-constructing elements. The desired second element is different from the desired first element.

The first control unit controls the desired first element on the basis of an output from the first operation state detection means, while the second control unit controls the desired second element on the basis of an output from the second operation state detection means. Accordingly, a fault of at least one of the first operation state detection means, the second operation state detection means, the first control unit and the second control unit is diagnosed.

In the first fault detection step, a fault of at least one of the first control unit and the first operation state detection means is detected, and a fault detection signal is outputted. In the first fault signal output step, upon receipt of the fault detection signal from the first fault detection step, the fault detection signal is outputted to the second control unit as a fault signal specific to the first control unit.

In the second fault detection step, a fault of at least one of the second control unit and the second operation state detection means is detected, and a fault detecting signal is outputted. In the second fault signal output step, upon receipt of the fault detection signal from the second fault detection step, the fault detection signal is outputted to the first control unit as a fault signal specific to the second control unit.

In the signal conversion step, at least one of the fault signal specific to the first control unit and the fault signal specific to the second control unit is received and is then converted to a signal which conforms with the predetermined communication system.

In the determination and diagnosis step, the fault signal so converted is read so that the fault of at least one of the first control unit, the first operation state detection means, the fault of the second control unit and the second operation state detection means is determined and diagnosed.

Optional Feature (B-1)

In the fault informing step, it is informed based on the converted fault signal that the first control unit or the first operation state detection means has the fault.

Optional Feature (B-2)

In the fault informing step, it is informed based on the converted fault signal that the second control unit or the second operation state detection means has the fault.

Optional Feature (B-3)

In the second determination and diagnosis step, the fault signal, which is specific to the first control unit and has been outputted in the first fault signal output step, is read to determine and diagnose the fault of the first control unit or the first operation state detection means.

Optional Feature (B-4)

In the second determination and diagnosis step, the fault signal, which is specific to the second control unit and has been outputted in the second fault signal output step, is read to determine and diagnose the fault of the second control unit or the second operation state detection means.

Method (C)

The automatic transmission operation state detection means detects the state of operation of the automatic transmission connected to the engine mounted on a vehicle, whereas the engine operation state detecting means detects the state of operation of the engine.

The transmission control unit controls the automatic transmission, whereas the engine control unit controls the engine, whereby a fault of at least one of the transmission operation state detection means, the engine operation state detection means, the transmission control unit and the engine control unit is diagnosed.

In the first fault detection step, a fault of at least one of the transmission control unit and the transmission operation state detection means is detected, and a fault detection signal is outputted.

In the first fault signal output step, upon receipt of the fault detection signal from the first fault detection step, the fault detection signal is outputted to the engine control unit as a fault signal specific to the transmission control unit.

In the second fault detection step, a fault of at least one of the engine control unit and the engine operate state detection means is detected and a fault detecting signal is outputted. In the second fault signal output step, upon receipt of the fault detection signal from the second fault detection step, the fault detection signal is outputted to the transmission control unit as a fault signal specific to the engine control unit.

In the signal conversion step, at least one of the fault signal specific to the transmission control unit and the fault signal specific to the engine control unit is received and is then converted to a signal which conforms with a predetermined communication system.

In the determination and diagnosis step, the fault signal so converted is read, and the fault of at least one of the transmission control unit, the transmission operation state detection means, the fault of the engine control unit and the engine operation state detection means is determined and diagnosed.

As has been described above, according to the apparatus (A), the method (B) and the optional features (A-1), (A-2), (A-6), (B-1) and (B-2), the provision of the first operation state detection means, the second operation state detection means, the first control unit, the second control unit, the first fault detection means, the first fault signal output means, the second fault detection means, the second fault signal output means, the conversion means, the determining and diagnosing means, and the informing means has made it possible to efficiently output coded signals conforming with the predetermined communication system while contriving to share signal lines. This has resulted in the advantages that the construction can be simplified and an increase in the manufacturing cost can be minimized.

According to the optional features (A-3), (A-4), (B-3) and (B-4), the additional provision of the second determining and diagnosing means has made it possible to determine and diagnose a fault of each sensor by using signals which have been coded in accordance with conversion rules which are specific to the first and second fault detection means, respectively. It is also possible to read sensor fault information through an external read terminal which has already been provided. This makes it possible to use a conventionally-used tester (that is, a tester independently designed, manufactured and marketed by each maker), leading to the advantage that these optional features can contribute to a further reduction in the increase in the manufacturing cost.

According to the optional feature (A-5) and the method (C), the first control unit is the engine control unit for controlling the engine mounted on the vehicle and the second control unit is the transmission control unit for controlling the automatic transmission connected to the engine. If the automatic transmission and/or the engine are controlled in such as way as deteriorating the exhaust gas, it is possible to detect and inform failed electronic component(s) which can be considered responsible for the deterioration. This has brought about the advantage that the control of the automatic transmission and/or engine can be performed adequately while retaining high reliability.

BRIEF DESCRIPTION OF THE DRAWINGS

FIG. 5 is a block diagram of a fault diagnosis apparatus according to a third embodiment of the present invention;

DETAILED DESCRIPTION OF THE INVENTION AND PREFERRED EMBODIMENTS

The embodiments of the present invention will hereinafter be described with reference to the drawings.

Figure 1:
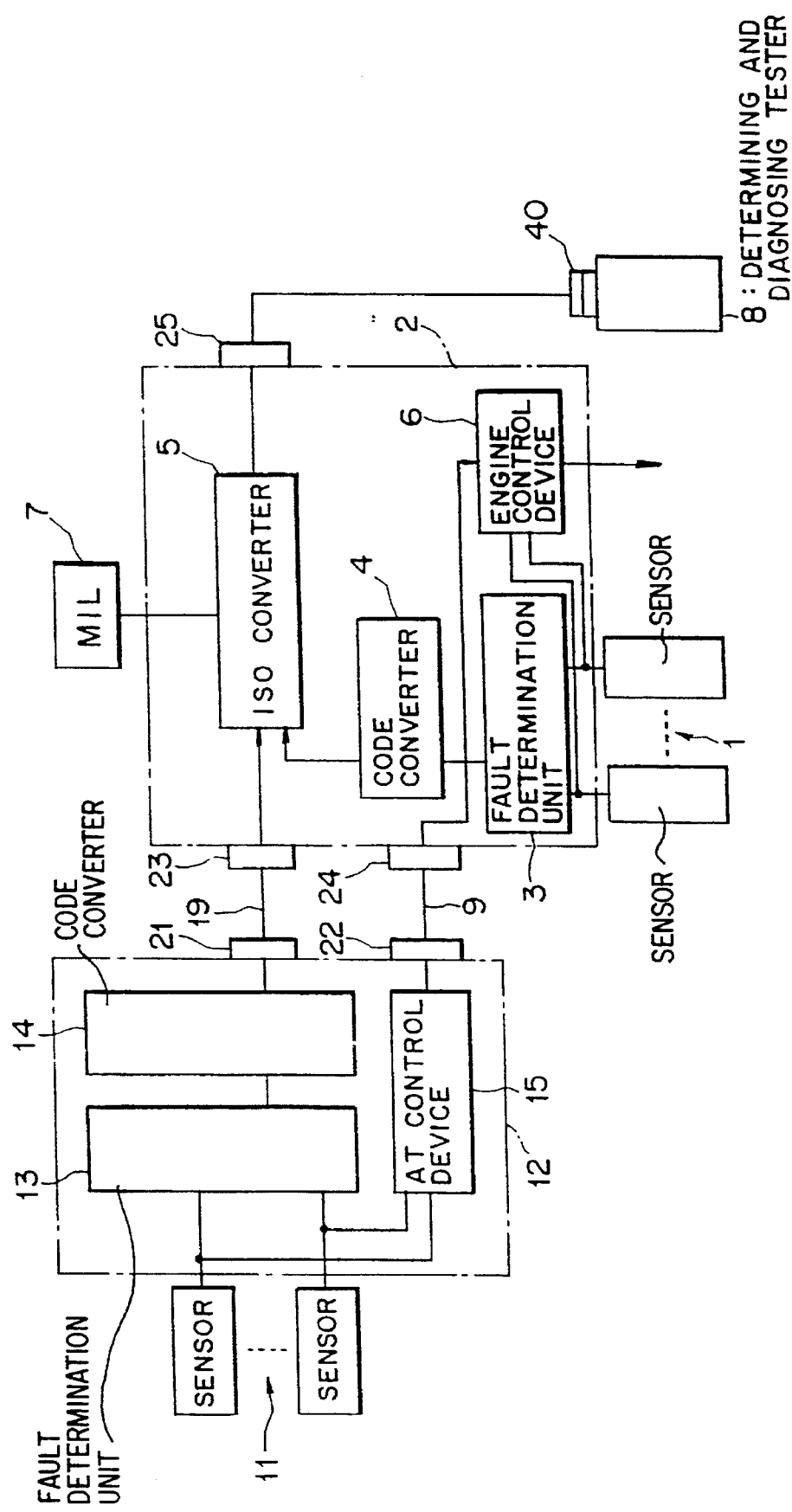
FIG. 1 is a block diagram of a fault diagnosis apparatus according to a first embodiment of the present invention.

(a) Description of the first embodiment:

Referring first to FIG. 1, the fault diagnosis apparatus according to the first embodiment of the present invention is suited for use in an automotive vehicle with an automatic transmission (AT, not shown) mounted thereon so that if the automatic transmission or an engine is controlled in such a way as deteriorating the exhaust gas, the fault diagnosis apparatus detects a failed electronic component—which is considered responsible for the deterioration—and informs it, for example, to a driver.

In FIG. 1, numeral 1 indicates one or more engine operation state detection sensors as the second operation state detection means or the engine operation state detection means. The engine operation state detection sensors 1 detect the state of operation of the engine as a desired element out of vehicle-constructing elements mounted on the vehicle and can include, for example, a throttle position sensor, an air flow sensor, an $O_2$ sensor and the like.

Designated at numeral 2 is an engine control unit as the second control unit. This engine control unit 2 can control the engine on the basis of information from each engine operation state detection sensor 1 and also can detect a fault of each engine operation state detection sensor 1. The engine control unit 2 comprises a fault determination unit 3, a code converter 4, an ISO (International Standardization Organization) converter 5 and an engine control device 6.

The fault determination unit 3 detects a fault of each engine operation state detection sensor 1. Namely, when inputted with a signal from each engine operation state detection sensor 1, the fault determination unit 3 determines whether or not the engine operation state detection sensor 1 has a fault.

The code converter 4 as the second fault signal output means, upon receipt of a fault detection signal from the fault determination unit 3, outputs it to the ISO converter 5 as a fault signal specific to the engine control unit 2. In other words, when the engine operation state detection sensor 1 is determined to have a fault by the fault determination unit 3, a coded signal indicating the fault (fault detection signal) is outputted.

Figure 4A:
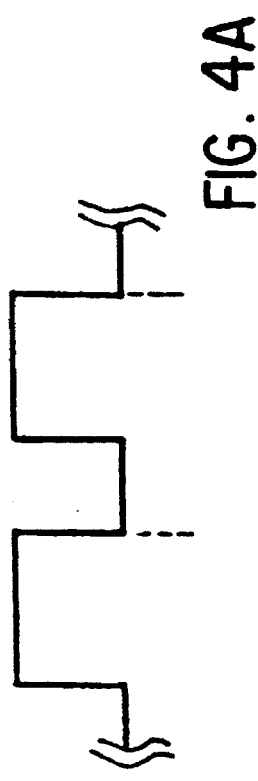
FIG. 4 is a signal sequence diagram showing fault detection signals of individual sensors.
Figure 4B:
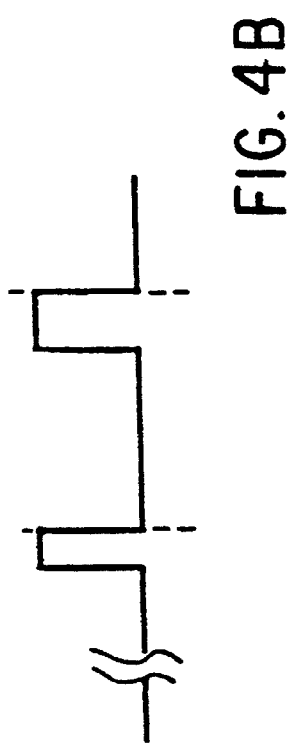
Figure 4C:
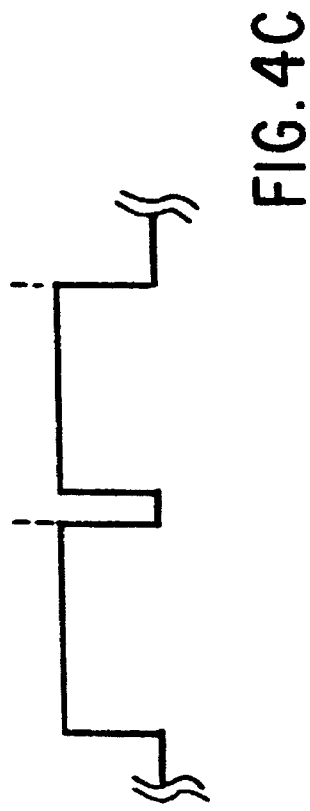

For example, fault detection signals may be outputted as shown in FIG. 4, based on detected operation state information from the throttle position sensor, air flow sensor and $O_2$ sensor as the engine operation state detection sensors 1. As is illustrated in FIG. 4, such fault detection signals are outputted with duty ratios varied depending on the individual sensors. Incidentally, the code conversion upon output of each fault detection signal is performed using conversion rules specific to the code converter 4.

The ISO converter (converter means) 5 receives fault detection signals from the code converter 4 and a code converter 14 (the first fault signal output means) which is to be described subsequently herein, and convert the respective fault detection signals into signals which conform a predetermined communication system. Described specifically by way of example, a coded signal indicating a fault of one of the engine operation state detection sensors 1 and another coded signal indicating a fault of one of below-described automatic transmission state detection sensors 11, said coded signals having been converted by the code converter 4 and the below-described code converter 14, respectively, are converted in accordance with prescribed communication regulations which specify a communication speed, data conversion rules, communication circuits and the like (for example, ISO 9141—signals converted by the ISO converter 5 will hereinafter be referred to merely as "ISO codes").

The engine control device 6 controls the state of operation of the engine on the basis of information from each engine operation state detection sensor 1.

Further, designated at numeral 12 is an AT control unit as the first control unit or the transmission control unit. This AT control unit 12 controls the automatic transmission on the basis of information from each AT operation state detection sensor 11 which detects the state of operation of the automatic transmission (AT) provided in association with the engine, and also detects a fault of the AT operation state detection sensor 11. This AT control unit 12 comprises a fault determining unit 13, the code converter 14 and an AT control device 15.

The AT operation state detection sensors 11 as the second operation state detection means or the transmission operation state detection means can include a pulse generator (hereinafter referred to as "the pulse generator A") for detecting a rotational speed of an AT input shaft, another pulse generator (hereinafter referred to as "the pulse generator B") for detecting a rotational speed of an AT output shaft, shift control solenoid valves for changing the speed range, a damper clutch control solenoid valve for controlling a damper clutch of a torque converter, pressure control solenoid valves for controlling hydraulic pressure to be supplied to frictional elements upon shifting, and the like. Although solenoid valves themselves can hardly be called "sensors", they are included in the AT operation state detection sensors 11 because the state of operation of the automatic transmission can be determined depending on the state of actuation of each solenoid valve, Upon input of a signal from one of the AT operation state detection sensors 11, the fault determining unit 13 as the first fault detection means determines whether or not the AT operation state detection sensor 11 has a fault.

The code converter 14 as the first fault signal output means, upon receipt of a fault detection signal from the fault determining unit 13, outputs it to the engine control unit 2 as a fault signal specific to the AT control unit 12. Described specifically, when one of the AT operation state detection sensors 11 is determined to have a fault by the fault determining unit 13, the code converter 14 outputs a coded signal indicating the fault (fault detection signal). Similarly to the signals shown in FIG. 4 with respect to the code converter 4, fault detection signals in this case are also outputted with duty ratios varied depending on the pulse generator A, the pulse generator B, each shift control solenoid valve, damper clutch control solenoid valve and each pressure control solenoid valve, respectively. The code conversion upon output of each fault detection signal is also performed using conversion rules specific to the code converter 14.

Designated at numerals 21–25 are input/output ports. The input/output ports 21,22 on a side of the AT control unit 12 are connected to input/output ports 23,24 on a side of the engine control unit 2 via control signal lines 19,9, respectively.

Described specifically, the input/output ports 21,23 and the control signal line 19 are interposed between the code converter 14 and the ISO converter 5 whereas the input/output ports 22,24 and the control signal line 9 are interposed between the AT control device 15 and the engine control device 6. Further, the ISO converter 5 and the below-described determining and diagnosing tester 8 as the determining and diagnosing means can be connected together via the input/output port 25 and an external read terminal 40.

As a consequence, information on a fault of one of the AT operation state detection sensors 11, said information having been coded as an output signal from the code converter 14, is inputted to the ISO converter 5.

The AT control device 15 controls the automatic transmission on the basis of information from each AT operation state detection sensor 11. Further, via the input/output ports 22,24 and the control signal line 9, cooperative control information can be exchanged between the AT control device 15 and the engine control device 6. This makes it possible, for example, to reduce the output of the engine at the time of shifting by retarding the ignition timing or reducing the throttle opening and hence to avoid a shifts shock, that is, to perform integrated control.

Further, an MIL (Malfunction Indicator Lamp) 7 is inputted, for example, with an ISO code from the ISO converter 5 and based on the signal, informs the driver of information on a fault of one of the engine operation state detection sensor 1, the engine control unit 2, AT operation state detection sensors 11 and the AT control unit 12 by turning on an indicator lamp, an alarm or the like.

As an alternative, the MIL 7 can be designed to turn on when a signal from the code converter 4 or 14 is inputted to the ISO converter 5.

The determining and diagnosing tester 8 is detachably connected to the external read terminal 40. This determining and diagnosing tester 8 reads via the external read terminal 40 an ISO code outputted from the ISO converter 5, and determines and diagnoses the sensor fault information.

Any indicator lamp can therefore be used as the MIL 7 as long as it can merely indicate occurrence of a fault in any of the sensors so that a fault diagnosis by the determining and diagnosing tester 8 can be induced.

Here, specific examples of a fault detection method by the AT operation state detection sensors 11 are presented below in Table 1.

| Diagnosed electronic component | Conditions for the determination of a fault |
|---|---|
| Pulse generator A | When an output from the pulse generator B is equal to or greater than a predetermined value but no output is produced from the pulse generator A within a predetermined time period. |
| Pulse generator B | When an output from the pulse generator A is equal to or greater than a predetermined value but no output is produced from the pulse generator B within a predetermined time period. |
| Each solenoid valve | An open circuit or short circuit has continued for a predetermined time period. |

Figure 7:
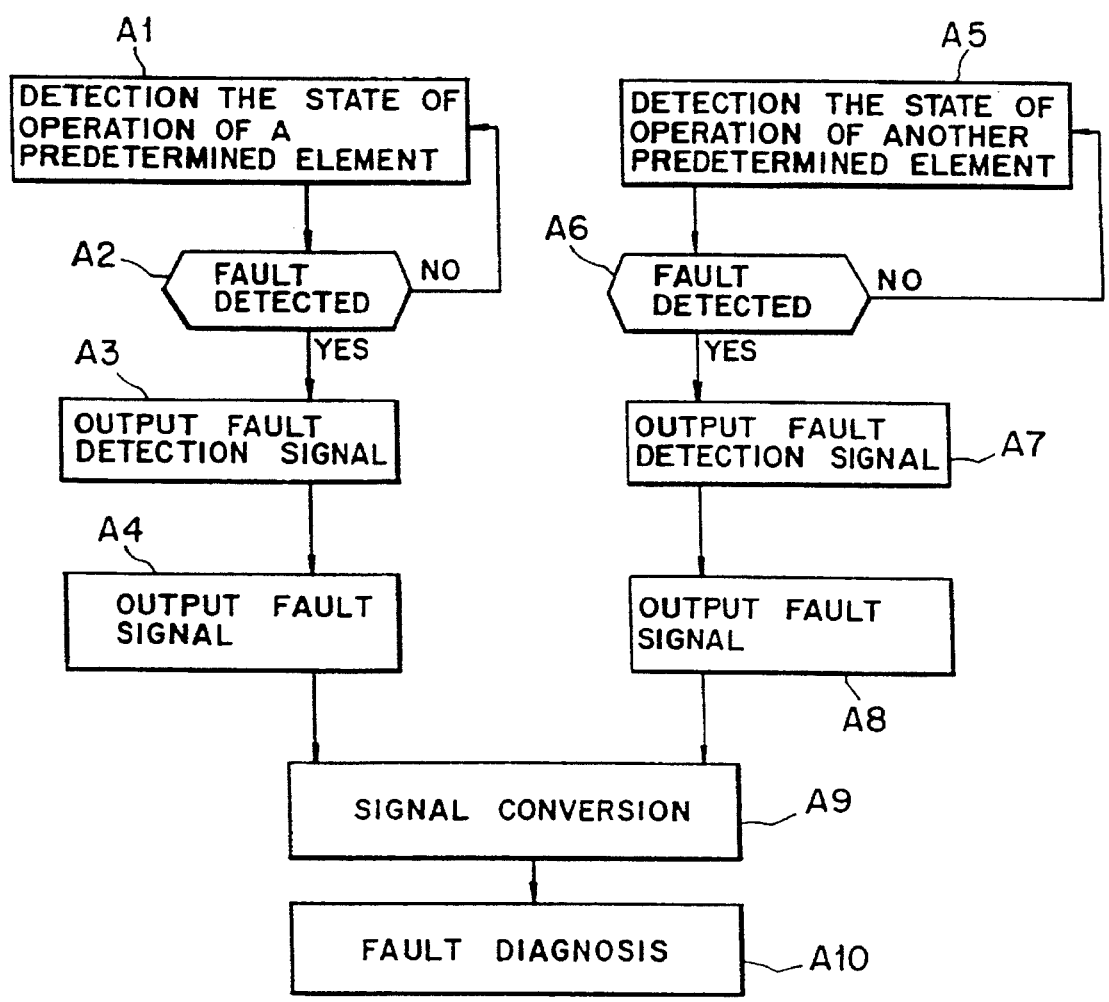
FIG. 7 is a flow chart illustrating operation of the fault diagnosis apparatus according to the first embodiment of the present invention.

Operation of the fault diagnosis apparatus according to the first embodiment of the present invention constructed as described above will hereinafter be described with reference to the flow chart shown in FIG. 7.

Based on information from one of the AT operation state detection sensors 11, the AT control device 15 controls the automatic transmission as the desired first element (step A1). A signal from the AT operation state detection sensor 11 is inputted to the fault determining unit 13, whereby it is determined whether the AT operation state detection sensor 11 has a fault (step A2).

When the above AT operation state detection sensor 11 has been found to have the fault (the YES route of step A2) the fault determining unit 13 outputs to the code converter 14 a fault detection signal indicating the fault (step A3).

Upon receipt of the fault detection signal from the fault determining unit 13, the code converter 14 converts the fault detection signal into a coded signal in accordance with the conversion rules specific to the converter 14 and stores the coded signal and at the same time, outputs the coded signal to the ISO converter 5 via the output port 21, the control signal line 19 and the input port 23 (step A4).

Further, based on information from one of the engine operation state detection sensors 1, the engine control device 6 controls the state of operation of the engine as the desired second element (step A5). A signal from one of the engine operation state detection sensors 1 is inputted to the fault determining unit 3, whereby it is determined whether the engine operation state detection sensor 1 has a fault (step A6).

When the engine operation state detection sensor 1 has been found to have the fault (the YES route of step A6), the fault determining unit 3 outputs to the code converter 4 a fault detection signal indicating the fault (step A7).

Upon receipt of the fault detection signal from the fault determining unit 3, the code converter 4 converts the fault detection signal into a coded signal in accordance with the conversion rules specific to the converter 4 and at the same time, outputs the coded signal to the ISO converter 5 (step A8).

The ISO converter 5 converts information on a fault of one of the engine operation state detection sensor 1, the engine control unit 2, the AT operation state detection sensor 11 and the AT control unit 12, said information having been converted to a coded signal by the code converter 4 or the code converter 14, into an ISO code (step A9).

The MIL 7, upon receipt of the ISO code from the ISO converter 5, inform the driver of the fault information of one of the engine operation state detection sensors 1, the engine control unit 2, the AT operation state detection sensors 11 and the AT control unit 12 by an alarm or the like.

Further, the determining and diagnosing tester 8 reads via the external read terminal 40 the ISO code outputted from the ISO converter 5, and determines and diagnoses the fault information (step A10).

By arranging only one ISO converter 5, which performs conversion into ISO codes to output fault information to the MIL 7 and the determining and diagnosing tester 8, in association with the engine control unit 2, coded signals conforming with the predetermined communication system can be efficiently outputted. This has resulted in the advantages that the construction can be simplified and an increase in the manufacturing cost can be minimized.

Figure 2:
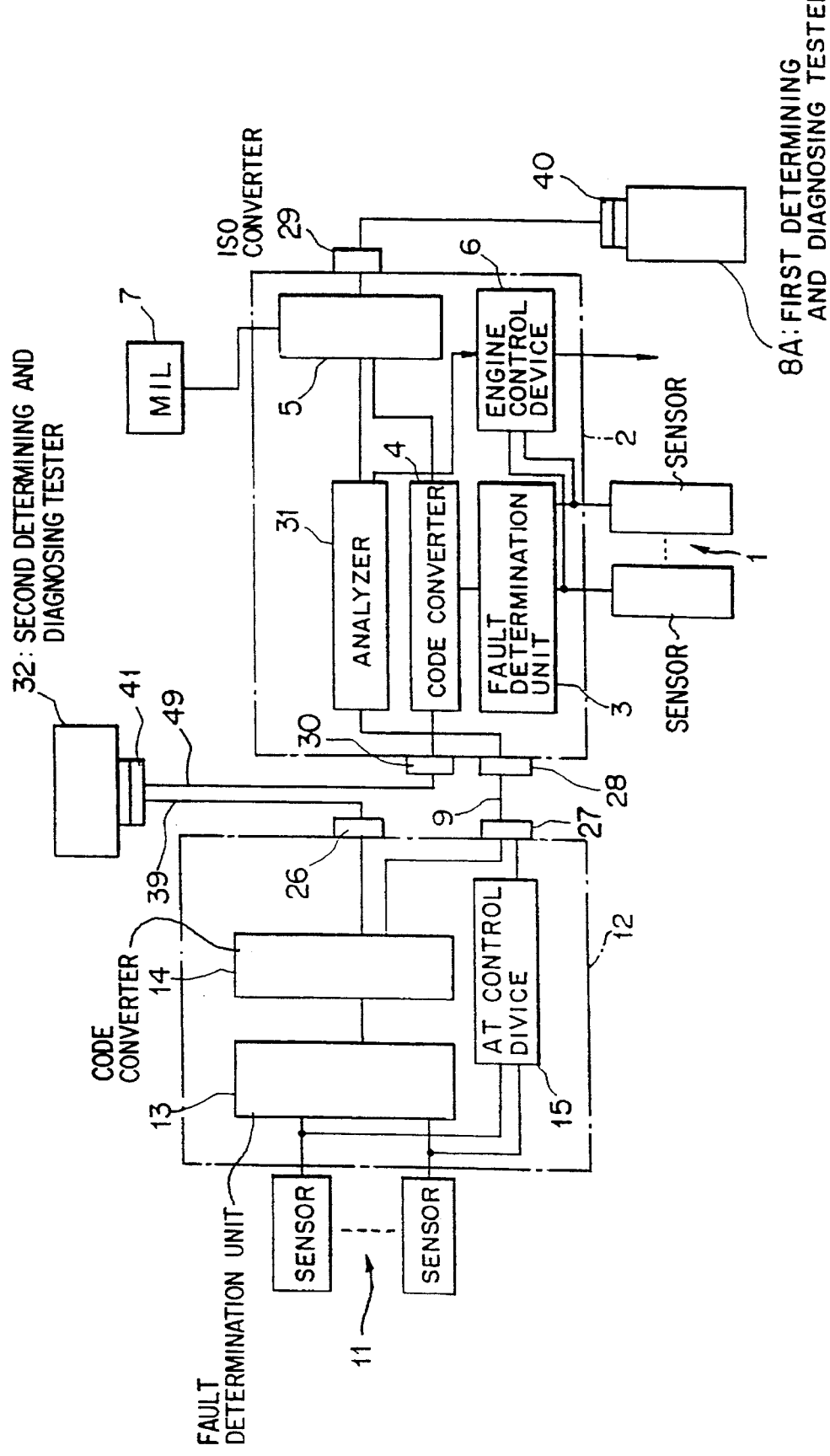
FIG. 2 is a block diagram of a fault diagnosis apparatus according to a second embodiment of the present invention.

(b) Description of the second embodiment:

The fault diagnosis apparatus according to the second embodiment of the present invention will next be described with reference to FIG. 2. As in the first embodiment, the fault diagnosis apparatus shown in FIG. 2 is also suitable for use in an automotive vehicle with an automatic transmission (AT) mounted thereon so that if the automatic transmission or an engine is controlled in such a way as deteriorating the exhaust gas, the fault diagnosis apparatus detects a failed electronic component—which is considered responsible for the deterioration—and informs it, for example, to a driver. The second embodiment is different from the first embodiment in that in addition to the possibility of determination of sensor fault information by reading an ISO code, sensor fault information can also be determined by reading a signal other than the ISO codes, said signal conforming with a communication system specific to a system employed in the engine control unit 3 and the AT control unit 12 (i.e., a coded signal converted by the above-described code converter 4 or 14).

In FIG. 2, numeral 12 indicates an AT control unit. This AT control unit 12, as in the first embodiment, can control an automatic transmission (not shown) on the basis of information from each AT operation state detection sensor 11 and can detect a fault of the AT operation state detection sensor 11. The AT control unit 12 comprises a fault determining unit 13, a code converter 4 and an AT control device 15, which are similar to the corresponding elements in the first embodiment.

The code converter 14 is connected to an external read terminal 41 via an input/output port 26 and a control signal line 39 and via an input/output port 27 on a side of the AT control unit 12, the control line 9 and an input/output port 28 on the side of the engine control unit 2, is also connected to an analyzer 31 on the side of the engine control unit 2.

Also connected via an input/output port 30 to the external read terminal 41 is the code converter 4 of the engine control unit 2, so that a second determining and diagnosing tester 32 can be connected.

Accordingly, a coded signal on a fault of one of the AT operation state detection sensors 11, said coded signal having been outputted from the code converter 14, is outputted to the second determining and diagnosing tester via the input/output port 26 and is also outputted to the analyzer 31 via the input/output port 27, the control signal line 9 and the input/output port 28. The AT control unit 12 and the engine control unit 2 can therefore exchange detected fault information in accordance with the conversion rules specific to the respective code converters.

Further, the AT control device 15 is also connected to the analyzer 31 in the engine control unit 2 via the input/output port 27, the control signal line 8 and the input/output port 28, so that control information can be exchanged by signals specific to the system between the AT control unit 12 and the engine control unit 2.

The engine control unit 2, like the corresponding element in the first embodiment, controls the engine on the basis of information from one or more engine operation state detections sensors 1, which detect the state of operation of the engine, and also detects a fault in one of the engine operation state detection sensors 1. The engine control unit 2 comprises the fault determining unit 3, the code converters 4, the ISO converter 5, the engine control unit 6 and an analyzer 31.

Here, a fault determining unit 3, a code converter 4, an ISO converter 5 and an engine control device 6 have substantially the same functions as the corresponding elements in the first embodiment, so that their description is omitted herein.

The analyzer 31 is inputted with a coded signal from the code converter 14 or a control signal from the AT control device 15, both arranged in the AT control unit 12, and then analyzes the signal, whereby the type of the signal is determined (a signal from the code converter 14 or a signal from the AT control device 15).

When the signal inputted to the analyzer 31 is determined to have been outputted from the code converter 14, the signal is outputted to the ISO converter 5. When the signal inputted to the analyzer 31 is determined to have been outputted form the AT control device 15, on the other hand, the signal is outputted to the engine control device 6.

Further, the determining and diagnosing tester 32 as the second determining and diagnosing means, which is connected detachably to the above-described external read terminal 41, is fed with coded signals from the code converter 4 via the input/output port 30 and a control signal line 49, so that fault information on the engine operation state detection sensors 1 are determined and diagnosed. Coded signals from the code converter 14 are also inputted to the determining and diagnosing tester 32 via the input/output port 26 and the control signal line 39. By reading these coded signals, fault information on the AT operation state detection sensors 11 are determined and diagnosed.

Incidentally, an MIL 7 connected to the ISO converter 5 and a first determining and diagnosing tester 8 as the first judging and diagnosing means connected to the ISO converter 5 via the input/output port 29 have similar functions to the MIL 7 and the determining and diagnosing tester 8 in the first embodiment, respectively, so that their description is omitted herein.

Owing to the above-described construction, the fault diagnosis apparatus according to the second embodiment of the present invention operated as will be described below.

The engine control device 6 controls the state of operation of the engine on the basis of information from each engine operation state detection sensor 1. A signal from each engine operation state detection sensor 1 is inputted to the fault determining unit 3, so that it is determined whether or not the engine operation state detection sensor 1 has a fault.

When the engine operation state detection sensor 1 has been determined to have the fault, a signal indicating the fault is coded by the code converter 4 in accordance with the conversion rules specific to the code converter 4 and the signal so coded is stored. Further, the coded signal is outputted to the ISO converter 5 and also to the second determining and diagnosing tester 32 via the input/output port 30 and the control signal line 49.

Further, the AT control device 15 controls the automatic transmission on the basis of information from each AT operation state detection sensor 11. Its control signal can be outputted via the analyzer 31 to the engine control device 6 in the engine control unit 2.

Upon input of a signal from each AT operation state detection sensor 11, the fault determining unit 13 determines whether or not the AT operation state detection sensor 11 has a fault.

When the AT operation state detection sensor 11 has been found to have the fault, a signal indicating the fault is coded by the code converter 14 in accordance with the conversion rules specific to the code converter 14 and the signal so coded is stored. The coded signal is also outputted to the analyzer 31 via the output port 27, the control signal line 9 and the input port 28. Further, the coded signal is also outputted to the second determining and diagnosing tester 32 via the input/output port 26 and the control signal line 39.

At the ISO converter 5, the fault information (i.e., fault detection signal) of one of the engine operation state detection sensor 1, the engine control unit 2, the AT operation state detection sensors 11 and the AT control unit 12, said fault information having been coded by the code converter 4 or code converter 14 in accordance with the conversion rules specific to the corresponding code converter, is converted into an ISO code.

Upon receipt of an output signal (fault signal) under the communication system of the ISO codes from the ISO converter 5, the MIL 7 informs the driver of the fault information of said one of the engine operation state detection sensor 1, the engine control unit 2, the AT operation state detection sensors 11 and the AT control unit 12 by an alarm or the like.

Further, the first determining and diagnosing tester 8A reads via the external read terminal 40 the signal which has been outputted from the ISO converter 5 and conforms with the communication system of the ISO codes, whereby the sensor fault information is determined and diagnosed.

At the second determining and diagnosing tester 32, each signal which has been outputted from the code converter 4 or the code converter 14 and has been coded in accordance with the conversion rules specific to the corresponding code converter is read via the external read terminal 41 which has already been provided, thereby making it possible to perform determination and diagnosis of sensor fault information in a similar manner to the first determining and diagnosing tester 8A.

To output sensor fault information to the MIL 7 and the first determining and diagnosing tester 8A, each signal has to be converted into an ISO code. To this end, the second embodiment requires mounting of only one ISO converter 5 on the engine control unit 2, leading to the advantages that coded signals conforming with the predetermined communication system can be efficiently outputted and an increase in the manufacturing cost can be reduced.

Further, owing to the provision of the second determining and diagnosing tester 32 to perform determination and diagnosis of a fault of each sensor by using a signal coded in accordance with the conversion rules specific to the corresponding code converter, the sensor fault information can be read through the external read terminal 41 which has already been provided. This makes it possible to use the conventionally-used tester (that is, a tester independently designed, manufactured and marketed by each maker) without any modification.

The control signal line 9 is shared when a coded signal and a cooperative control signal are outputted to the analyzer 31 from the code converter 14 and AT control device 15, respectively. This can contributed to a further reduction in the increase in the manufacturing cost.

Figure 3:
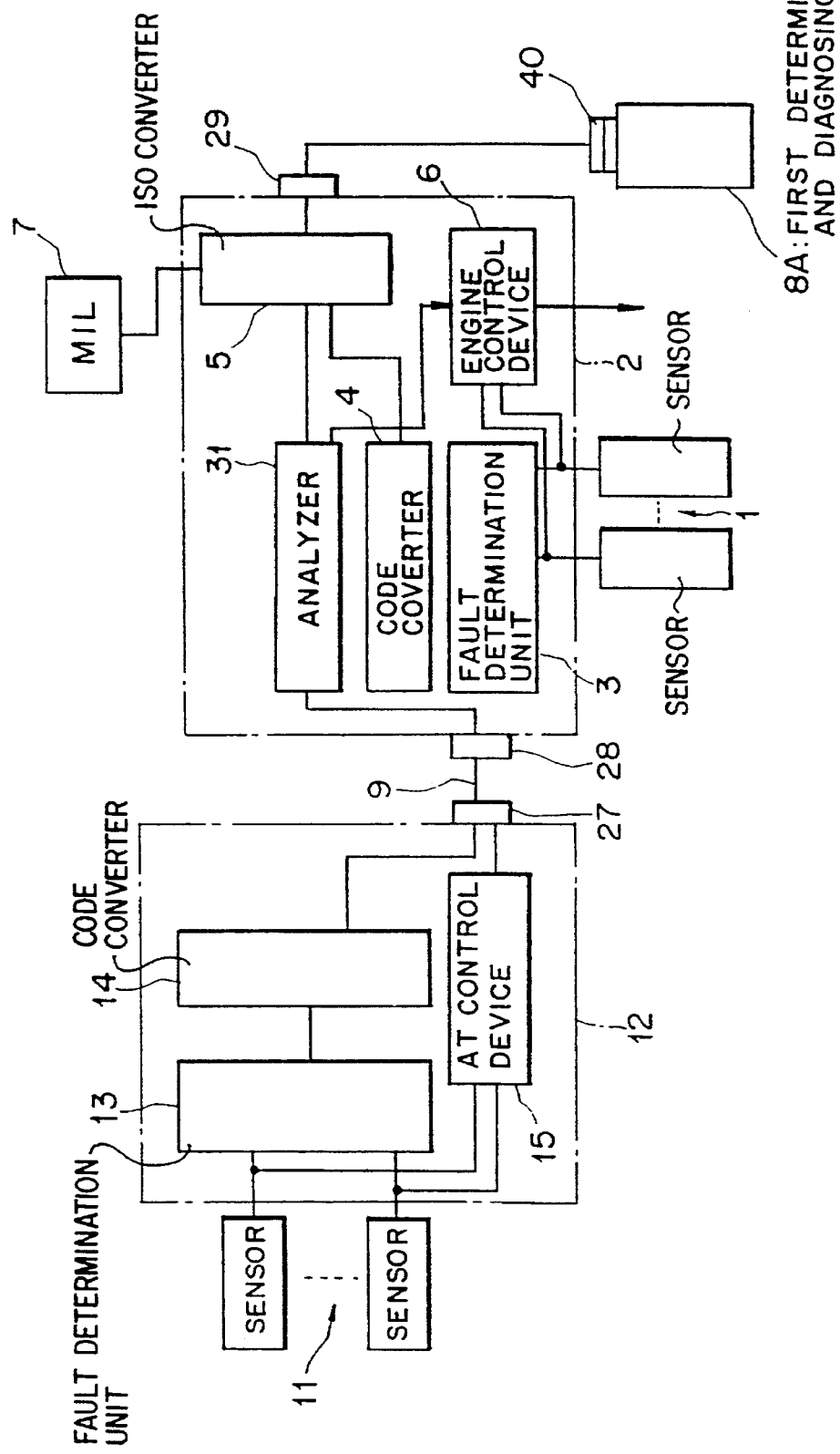
FIG. 3 is a block diagram showing a fault diagnosis apparatus as a modification of the second embodiment of the present invention.

In the second embodiment, it is designed to perform determination and diagnosis of sensor fault information by the first determining and diagnosing tester 8A and at the same time determination and diagnosis of sensor fault information by the second determining and diagnosing tester 32. The diagnosis by the second determining and diagnosing tester 32 can however be omitted. The fault diagnosis apparatus according to this modification can be drawn as shown in the diagram of FIG. 3.

(c) Others

In each of the above-described embodiments, the fault determining unit 13 in the AT control unit 12 is designed to detect faults of the AT operation state detection sensors 11 only. This invention is however not limited to this design. By providing a system for detecting a fault of the AT control unit 12 itself, the fault of the AT control unit 12 itself can be detected.

Likewise, the fault determining unit 3 in the engine control unit 2 is desired to detect faults of the engine operation state detection sensors 1 alone. This invention is however not limited to this design. A fault of the engine control unit 2 itself can also be detected.

In each of the above-described embodiments, each signal is converted at the engine control unit 2 to a signal conforming with the communication system of the ISO codes. According to the present invention, it is possible to arrange the ISO converter on the side of the AT control unit 12 and to convert each signal into a signal conforming with the communication system of the ISO codes.

Further, in each of the above-described embodiments, the AT control unit 12 is connected to the engine control unit 2 so that each fault of the AT operation state detection sensors 11 is outputted to the engine control unit 2. Where plural other control units, for example, a traction control (TRC) control unit, an ABS control unit and a power steering control unit are additionally provided, these additional control units can be connected, like the AT control unit 12, to the engine control unit 2 so that faults of sensors connected to such additional control units can be outputted to the engine control unit 2. In this case, the ISO converter 5 arranged in the engine control unit 2 has to be replaced by one having a larger capacity.

As an alternative, it is possible, as is illustrated in FIG. 5, to divide plural control units into some blocks and to provide only desired control units with an ISO converter 5 instead of connecting all the units to the engine control unit 2. According to this construction, it is unnecessary to use an ISO convert of such a large capacity as mentioned above.

This alternative construction will now be described more specifically with reference to FIG. 5. Instead of connecting all the units to the engine control unit 2, the AT control unit 12, a TRC control unit 51 and the engine control unit 2 are grouped as a first block 52, whereas a power steering control unit 53 and an ABS control unit 54 are grouped as a second block 55. The first block 52 and the second block 55 can be provided with their own ISO converters 5, respectively, for example, one in the engine control unit 2 and the other in the ABS control unit 54.

Figure 6:
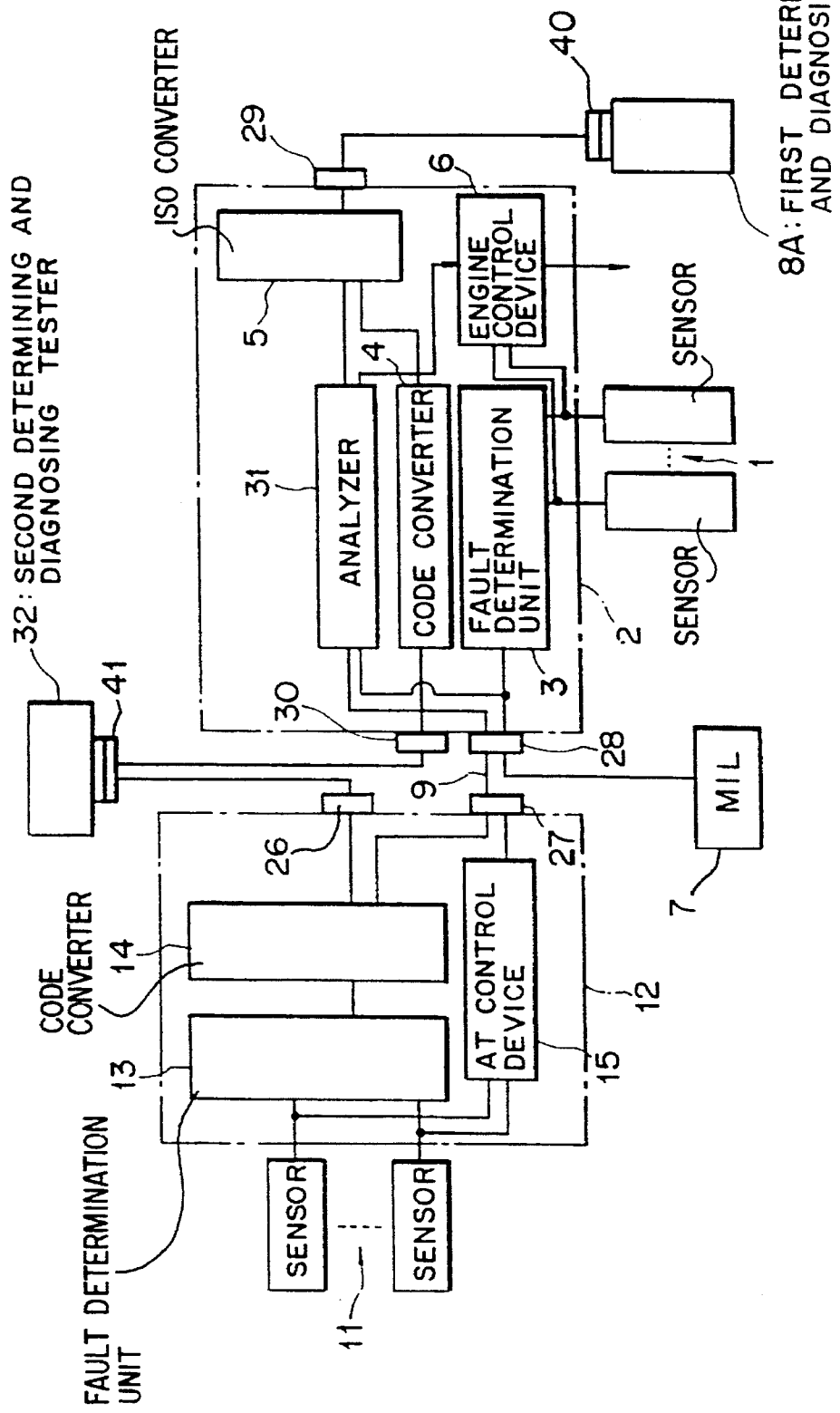
FIG. 6 is a block diagram of a fault diagnosis apparatus as another modification of the second embodiment of the present invention.

In each of the above embodiments, the MIL 7 is connected to the ISO converter 5. The MIL 7 can however be connected to the code converters 4,14 or the fault determining units 3,13 so that the MIL 7 can be turned on by a signal therefrom. Since the second embodiment is provided with the analyzer 31, the MIL 7 is arranged in such a way that as shown in FIG. 6, the MIL 6 is connected to the fault determining unit 3 via the input/output port 28 and also to the analyzer 31 via the input/output port 28.

Each of the above embodiments has been described by taking, as an example, faults of electronic components, said faults being responsible for a deterioration in the exhaust gas. It should however be borne in mind that the present invention is not limited to such electronic components but can be used for the detection of a fault of any electronic component mounted on a vehicle.

What is claimed is:

1. A fault diagnosis apparatus for a vehicle control system having:

first operation state detection means for detecting the state of operation of a desired first element out of vehicle-constructing elements mounted on a vehicle, second operation state detection means for detecting the state of operation of a desired second element out of said vehicle-constructing elements, said desired second element being different from said first element, a first control unit for controlling said desired first element on the basis of an output from said first operation state detection means, and a second control unit for controlling said desired second element on the basis of an output from said second operation state detection means, whereby a fault of at least one of said first operation state detection means, said second operation state detection means, said first control unit and said second control unit is diagnosed, which apparatus comprises:

first fault detection means arranged in association with said first control unit to detect a fault of at least one of said first control unit and said first operation state detection means, first fault signal output means arranged in association with said first control unit to output to said second control unit a fault detection signal, which has been received from said first fault detection means, as a fault signal specific to said first control unit;

second fault detection means arranged in association with said second control unit to detect a fault of at least one of said second control unit and said second operation state detection means;

second fault signal output means arranged in association with said second control unit to output a fault detection signal, which has been received from said second fault detection means, as a fault signal specific to said second control unit;

converter means arranged in association with said second control unit to receive the fault signal from at least one of said first fault signal output means and said second fault signal output means and then to convert said fault signal into a signal which conforms with a predetermined communication system;

first determining and diagnosing means for reading the fault signal so converted, thereby determining and diagnosing the fault of at least one of said first control unit, said first operation state detection means, the fault of said second control unit and said second operation state detection means; and second determining and diagnosing means for reading a fault signal from said first fault signal output means to determine and diagnose a fault of said first control unit or said first operation state detection means.

2. A fault diagnosis apparatus according to claim 1, further comprising means for informing a fault, if any, of said first control unit or said first operation state detection means.

3. A fault diagnosis apparatus according to claim 1, further comprising means for informing a fault, if any, of said second control unit or said second operation state detection means.

4. A fault diagnosis apparatus according to claim 1, wherein at least one third control unit selected from a TRC control unit, an ABS control unit and a power steering control unit, to which third control unit third operation state detection means is connected to detect the state of operation of said third control unit, is connected to said second control unit, whereby information on the detection of a fault in said third control unit or said third operation state detection means is outputted to said second control unit.

5. A fault diagnosis apparatus for a vehicle control system having:

first operation state detection means for detecting the state of operation of a desired first element out of vehicle-constructing elements mounted on a vehicle, second operation state detection means for detecting the state of operation of a desired second element out of said vehicle-constructing elements, said desired second element being different from said first element, a first control unit for controlling said desired first element on the basis of an output from said first operation state detection means, and a second control unit for controlling said desired second element on the basis of an output from said second operation state detection means, whereby a fault of at least one of said first operation state detection means, said second operation state detection means, said first control unit and said second control unit is diagnosed, which apparatus comprises:

first fault detection means arranged in association with said first control unit to detect a fault of at least one of said first control unit and said first operation state detection means, first fault signal output means arranged in association with said first control unit to output to said second control unit a fault detection signal, which has been received from said first fault detection means, as a fault signal specific to said first control unit;

second fault detection means arranged in association with said second control unit to detect a fault of at least one of said second control unit and said second operation state detection means;

second fault signal output means arranged in association with said second control unit to output a fault detection signal, which has been received from said second fault detection means, as a fault signal specific to said second control unit;

converter means arranged in association with said second control unit to receive the fault signal from at least one of said first fault signal output means and said second fault signal output means and then to convert said fault signal into a signal which conforms with a predetermined communication system;

first determining and diagnosing means for reading the fault signal so converted, thereby determining and diagnosing the fault of at least one of said first control unit, said first operation state detection means, the fault of said second control unit and said second operation state detection means; and second determining and diagnosing means for reading a fault signal from said second fault signal output means to determine and diagnose a fault of said second control unit or said second operation state detection means.

6. A fault diagnosis apparatus according to claim 5, further comprising means for informing a fault, if any, of said first control unit or said first operation state detection means.

7. A fault diagnosis apparatus according to claim 5, further comprising means for informing a fault, if any, of said second control unit or said second operation state detection means.

8. A fault diagnosis apparatus according to claim 5, wherein at least one third control unit selected from a TRC control unit, an ABS control unit and a power steering control unit, to which third control unit third operation state detection means is connected to detect the state of operation of said third control unit, is connected to said second control unit, whereby information on the detection of a fault in said third control unit or said third operation state detection means is outputted to said second control unit.

9. A fault diagnosis method for a vehicle control system having:

first operation state detection means for detecting the state of operation of a desired first element out of vehicle-constructing elements mounted on a vehicle, second operation state detection means for detecting the state of operation of a desired second element out of said vehicle-constructing elements, said desired second element being different from said first element, a first control unit for controlling said desired first element on the basis of an output from said first operation state detection means, and a second control unit for controlling said desired second element on the basis of an output from said second operation state detection means, whereby a fault of at least one of said first operation state detection means, said second operation state detection means, said first control unit and said second control unit is diagnosed, which method comprises:

a first fault detection step for detecting a fault of at least one of said first control unit and said first operation state detection means to output a fault detection signal;

a first fault signal output step for outputting, upon receipt of the fault detection signal from said first fault detection step, the fault detection signal to said second control unit as a fault signal specific to said first control unit;

a second fault detection step for detecting a fault of at least one of said second control unit and said second operation state detection means to output a fault detection signal;

a second fault signal output step for outputting, upon receipt of the fault detection signal from said second fault detection step, the fault detection signal to said first control unit as a fault signal specific to said second control unit;

a signal conversion step for receiving at least one of the fault signal specific to said first control unit and the fault signal specific to said second control unit and converting the fault signal into a signal which conforms with a predetermined communication system;

a first determination and diagnosis step for reading the fault signal so converted and determining and diagnosing the fault of at least one of said first control unit, said first operation state detection means, the fault of said second control unit and said second operation state detection means; and a second determination and diagnosis step for reading the fault signal, which is specific to said first control unit and has been outputted in said first fault signal output step, and determining and diagnosing the fault of said first control unit or said first operation state detection means.

10. A fault diagnosis method according to claim 9, further comprising a step for informing the fault of said first control unit or said first operation state detection means on the basis of the converted fault signal.

11. A fault diagnosis method according to claim 9, further comprising a step for informing the fault of said second control unit or said second operation state detection means on the basis of the converted fault signal.

12. A fault diagnosis method for a vehicle control system having:

first operation state detection means for detecting the state of operation of a desired first element out of vehicle-constructing elements mounted on a vehicle, second operation state detection means for detecting the state of operation of a desired second element out of said vehicle-constructing elements, said desired second element being different from said desired first element, a first control unit for controlling said desired first element on the basis of an output from said first operation state detection means, and a second control unit for controlling said desired second element on the basis of an output from said second operation state detection means, whereby a fault of at least one of said first operation state detection means, said second operation state detection means, said first control unit and said second control unit is diagnosed, which method comprises:

a first fault detection step for detecting a fault of at least one of said first control unit and said first operation state detection means to output a fault detection signal;

a first fault signal output step for outputting, upon receipt of the fault detection signal from said first fault detection step, the fault detection signal to said second control unit as a fault signal specific to said first control unit;

a second fault detection step for detecting a fault of at least one of said second control unit and said second operation state detection means to output a fault detection signal;

a second fault signal output step for outputting, upon receipt of the fault detection signal from said second fault detection step, the fault detection signal to said first control unit as a fault signal specific to said second control unit;

a signal conversion step for receiving at least one of the fault signal specific to said first control unit and the fault signal specific to said second control unit and converting the fault signal into a signal which conforms with a predetermined communication system;

a first determination and diagnosis step for reading the fault signal so converted and determining and diagnosing the fault of at least one of said first control unit, said first operation state detection means, the fault of said second control unit and said second operation state detection means; and a second determination and diagnosis step for reading the fault signal, which is specific to said second control unit and has been outputted in said second fault signal output step, and determining and diagnosing the fault of said second control unit or said second operation state detection means.

13. A fault diagnosis method according to claim 12, further comprising a step for informing the fault of said first control unit or said first operation state detection means on the basis of the converted fault signal.

14. A fault diagnosis method according to claim 12, further comprising a step for informing the fault of said second control unit or said second operation state detection means on the basis of the converted fault signal.

15. A fault diagnosis method for a vehicle control system having:

means for detecting the state of operation of an automatic transmission connected to an engine mounted on a vehicle;

means for detecting the state of operation of said engine, a transmission control unit for controlling said automatic transmission, and an engine control unit for controlling said engine, whereby a fault of at least one of said transmission operation state detection means, said engine operation state detection means, said transmission control unit and said engine control unit is diagnosed, which method comprises:

a first fault detection step for detecting a fault of at least one of said transmission control unit and said transmission operation state detection means to output a fault detection signal;

a first fault signal output step for outputting, upon receipt of the fault detection signal from said first fault detection step, the fault detection signal to said engine control unit as a fault signal specific to said transmission control unit;

a second fault detection step for detecting a fault of at least one of said engine control unit and said engine operate state detection means to output a fault detection signal;

a second fault signal output step for outputting, upon receipt of the fault detection signal from said second fault detection step, the fault detection signal to said transmission control unit as a fault signal specific to said engine control unit;

a signal conversion step for receiving at least one of the fault signal specific to said transmission control unit and the fault signal specific to said engine control unit and converting the fault signal into a signal which conforms with a predetermined communication system;

a first determination and diagnosis step for reading the fault signal so converted and determining and diagnosing the fault of at least one of said transmission control unit, said transmission operation state detection means, the fault of said engine control unit and said engine operation state detection means; and a second determination and diagnosing step for reading the fault signal, which is specific to said transmission control unit and has been outputted in said first fault signal output step, and determining and diagnosing the fault of said transmission control unit or said transmission operation state detection means.

16. A fault diagnosis method for a vehicle control system having:

means for detecting the state of operation of an automatic transmission connected to an engine mounted on a vehicle;

means for detecting the state of operation of said engine, a transmission control unit for controlling said automatic transmission, and an engine control unit for controlling said engine, whereby a fault of at least one of said transmission operation state detection means, said engine operation state detection means, said transmission control unit and said engine control unit is diagnosed, which method comprises:

a first fault detection step for detecting a fault of at least one of said transmission control unit and said transmission operation state detection means to output a fault detection signal;

a first fault signal output step for outputting, upon receipt of the fault detection signal from said first fault detection step, the fault detection signal to said engine control unit as a fault signal specific to said transmission control unit;

a second fault detection step for detecting a fault of at least one of said engine control unit and said engine operate state detection means to output a fault detection signal;

a second fault signal output step for outputting, upon receipt of the fault detection signal from said second fault detection step, the fault detection signal to said transmission control unit as a fault signal specific to said engine control unit;

a signal conversion step for receiving at least one of the fault signal specific to said transmission control unit and the fault signal specific to said engine control unit and converting the fault signal into a signal which conforms with a predetermined communication system;

a first determination and diagnosis step for reading the fault signal so converted and determining and diagnosing the fault of at least one of said transmission control unit, said transmission operation state detection means, the fault of said engine control unit and said engine operation state detection means;

a second determination and diagnosis step for reading the fault signal, which is specific to said engine control unit and has been outputted in said second fault signal output step, and determining and diagnosing the fault of said engine control unit or said engine operation state detection means.

* * * * *